(12) United States Patent
Pacsai

(10) Patent No.: US 7,864,889 B2
(45) Date of Patent: Jan. 4, 2011

(54) METHOD AND SYSTEM FOR ESTABLISHING AN ADAPTABLE OFFSET FOR A RECEIVER

(75) Inventor: Ernest Edmond Pacsai, Wixom, MI (US)

(73) Assignee: Robert Bosch GmbH, Stuttgart (DE)

( * ) Notice: Subject to any disclaimer, the term of this patent is extended or adjusted under 35 U.S.C. 154(b) by 1489 days.

(21) Appl. No.: 11/153,308

(22) Filed: Jun. 15, 2005

(65) Prior Publication Data

US 2005/0276352 A1    Dec. 15, 2005

Related U.S. Application Data

(60) Provisional application No. 60/579,634, filed on Jun. 15, 2004.

(51) Int. Cl.
*H04L 25/06* (2006.01)
*H04L 25/10* (2006.01)

(52) U.S. Cl. .................. 375/317; 375/318; 375/319

(58) Field of Classification Search ............... 375/316, 375/136, 143, 144, 147, 148, 227, 233, 260, 375/346; 455/68; 327/143
See application file for complete search history.

(56) References Cited

U.S. PATENT DOCUMENTS

| | | | |
|---|---|---|---|
| 4,063,039 A | 12/1977 | Endres et al. | |
| 4,223,270 A * | 9/1980 | Schmid et al. | ................. 327/33 |
| 4,387,465 A | 6/1983 | Becker | |
| 4,893,316 A | 1/1990 | Janc et al. | |
| 5,200,707 A | 4/1993 | Weaver | |
| 5,623,518 A * | 4/1997 | Pfiffner | ...................... 375/278 |
| 6,229,997 B1 | 5/2001 | Addy | |
| 6,275,959 B1 | 8/2001 | Ransijn | |
| 6,654,594 B1 | 11/2003 | Hughes et al. | |
| 6,665,526 B2 | 12/2003 | Tsuji et al. | |
| 6,714,062 B2 | 3/2004 | Kappes | |
| 6,725,027 B1 | 4/2004 | Tsuji et al. | |
| 6,751,255 B1 * | 6/2004 | Reuven et al. | ............... 375/233 |
| 6,987,804 B2 * | 1/2006 | Buchali et al. | ............... 375/233 |
| 6,988,227 B1 * | 1/2006 | Perrott | ....................... 714/704 |
| 2001/0016475 A1 | 8/2001 | Tsujishita et al. | |
| 2002/0122504 A1 | 9/2002 | Payne et al. | |
| 2002/0151292 A1 | 10/2002 | Sevens et al. | |
| 2002/0172374 A1 | 11/2002 | Bizjak | |
| 2004/0067743 A1 | 4/2004 | Altizer et al. | |
| 2005/0047489 A1 * | 3/2005 | Yousef et al. | ................ 375/148 |
| 2005/0190859 A1 * | 9/2005 | Brandwein, Jr. | ............ 375/316 |
| 2007/0136056 A1 * | 6/2007 | Moogi et al. | ................ 704/227 |

* cited by examiner

*Primary Examiner*—Chieh M Fan
*Assistant Examiner*—Qutbuddin Ghulamali
(74) *Attorney, Agent, or Firm*—Michael Best & Friedrich LLP

(57) ABSTRACT

A method and system of establishing an offset for a receiver. In one embodiment, a method includes receiving an input signal and generating a first signal. The method can further include integrating the input signal and the first signal at a reference node. In addition, the method can include comparing the input signal to a signal at the reference node and generating an output signal, analyzing the output signal to determine whether the output signal contains noise, and modifying the first signal based on the analysis of the output signal.

24 Claims, 2 Drawing Sheets

METHOD AND SYSTEM FOR ESTABLISHING AN ADAPTABLE OFFSET FOR A RECEIVER

RELATED APPLICATIONS

This application claims priority to provisional application No. 60/579,634 filed on Jun. 15, 2004.

FIELD OF INTEREST

Embodiments of the invention relate to receivers configured to adapt to the magnitude of noise in input signals. Some embodiments of the invention may be used as receivers in remote-control systems, such as remote keyless entry ("RKE") or similar systems used in vehicles.

BACKGROUND

When designing a high-sensitivity receiver, it is often desirable to set the data detection sensitivity of the receiver close to the level of the noise in the signals that one is interested in receiving. However, even when the sensitivity is set at this level, noise may still interfere with operation of the receiver.

SUMMARY

Noise interference with receiver operation is particularly prevalent in environments with variable noise. Variable noise may be generated, for example, by microprocessors cycling on and off or by electric motors. Variable noise can cause a receiver to "wake up" even when a signal of interest is not present. In applications where low-current receivers are used, activity by a receiver in the absence of a signal of interest can cause the receiver to exceed the current consumption requirements that a user or manufacturer may specify. For example, in vehicles, the operation of remote door locks, alarms, and other accessories draws current from a battery or batteries with limited capabilities to supply current. Receivers that are unnecessarily active add to the current demands placed on vehicle batteries. In modern vehicles, there are numerous control units, accessories, and other devices that may require a current, voltage, or power source. Thus, even relatively small levels of unnecessary current usage can adversely impact a vehicle battery or electrical system.

In view of the above, embodiments of the invention provide an adaptable receiver configured to adjust in a varying noise environment. Embodiments of the invention provide a reference input to a comparator controlled by a processor. The processor adjusts the reference input to adapt to variable noise. Embodiments of the invention inject a pulse-controlled signal to a comparator to create an adaptable reference.

In one embodiment, the invention provides a method of establishing an offset for a receiver. The method may include receiving an input signal; generating a first signal; directing the input signal and the first signal to a reference node; coupling a capacitor to the reference node; integrating the input signal and the first signal at the reference node; comparing the input signal to a signal at the reference node and generating an output signal; analyzing the output signal to determine whether the output signal contains noise or information that conforms to a predetermined information format; and modifying the first signal based on the analysis of the output signal.

In another embodiment, the invention provides a receiver having a comparator. The comparator is configured to receive an input signal, to compare the input signal to a signal at a reference node, and to generate an output signal. The receiver also includes a processor configured to generate a pulse-controlled signal having a pulse width. The processor is coupled to the comparator so that the pulse-controlled signal is delivered to the reference node and the output signal of the comparator is delivered to the processor. The processor analyzes the output signal to determine whether the output signal contains noise or information that conforms to a predetermined information format, and modifies the pulse width of the pulse-controlled signal based on the analysis of the output signal. A capacitor is coupled to the reference node. The pulse-controlled signal provided to the reference node is integrated with the input signal to provide a stable reference.

Additional aspects of embodiments of the invention are illustrated in the drawings and provided in the subsequent description.

DETAILED DESCRIPTION

Figure 1:
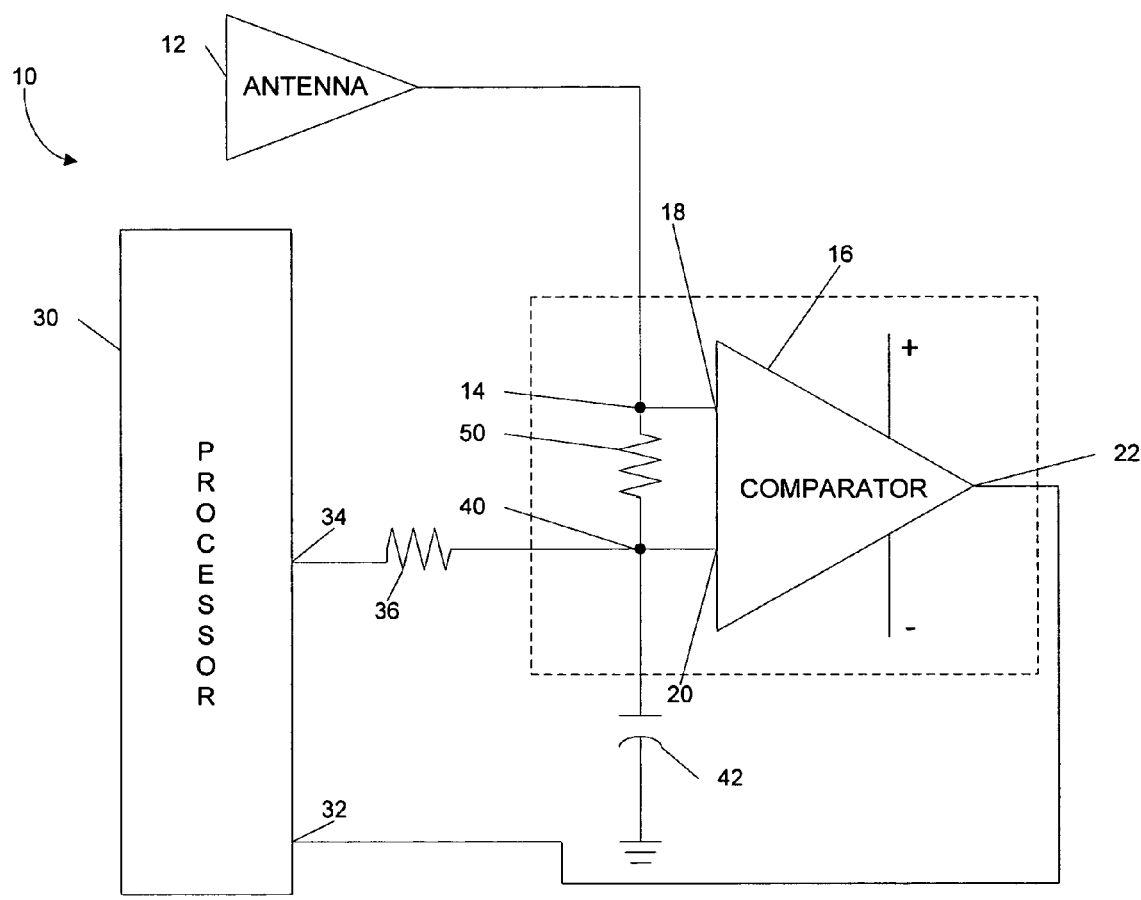
FIG. 1 is a circuit diagram of an exemplary embodiment of the invention.

Before embodiments of the invention are explained in detail, it is to be understood that the invention is not limited in its application to the details of the examples set forth in the following description or illustrated in the drawings. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

FIG. 1 illustrates an exemplary receiver 10. The receiver 10 may be configured to obtain and process input signals or messages. In some embodiments, the receiver 10 may be configured to process tire pressure messages, keyless entry messages, or the like in a vehicle. The receiver 10 may be configured to receive radio-frequency signals, although configuring the receiver to receive other signals is possible.

An input signal may be received by a reception device or element 12. The reception element 12 may be an antenna. Alternatively, signals of interest may be fed from another source, such as a cable or network. The input signal may be filtered or unfiltered. A filter may be used, for example, to remove signals outside a certain frequency band. Regardless of whether the input signal is filtered, the input signal may still include noise. The input signal may be considered as having a desired signal or information portion and a noise portion.

The input signal received at the reception element 12 is directed to an input node 14 coupled to a comparator 16. Although a direct connection is shown between the element 12 and the input node 14, components such as resistors, amplifiers, or the like may be situated between the element 12 and the input node 14. Thus, the signal present at the input node 14 may be the same as the input signal received at reception element 12 or a version thereof. A number of components such as de-multiplexers, filters, amplifiers, delays, or the like may process the input signal between the reception element 12 and the input node 14 to create a version of the input signal at the input node 14.

As should be understood by one of ordinary skill in the art, a variety of signal conditioning elements could be connected between various components of the embodiments described herein. Strictly speaking, the output of a signal conditioning circuit is not identical to its input, for example, an output signal differs in at least timing or phase from an input signal even in the simplest of components, although the time or phase difference may be very small. In any event it should be understood that the use of additional circuitry is within the scope of embodiments of the invention. Thus, unless the context indicates otherwise, the term "signal" encompasses an original signal and versions of that signal that might be created through the use of conditioning circuitry placed between two components.

The comparator 16 has a data input 18, a reference input 20, and an output 22. In some embodiments, the comparator 16 may be constructed using an integrated circuit such as integrated circuit model LMV 324 manufactured by National Semiconductor. In some embodiments, the data input 18 is coupled to the input node 14 and receives a signal from the input node 14. In some embodiments, the comparator 16 is configured to perform a selection of the signals at the data input 18 and the reference input 20. More specifically, the comparator 16 may compare a signal received at the data input 18 to a signal received at the reference input 20 and generate an output signal at the output 22 by performing a selection of the signal having the greatest amplitude. As a consequence, the signal at the data input 18 or the reference input 20 having the greatest amplitude is output as the output signal on output 22.

The comparator 16 may also be configured to generate one of two possible logic signals. The two possible output signals may correspond to one of two logic states. For example, the comparator 16 may generate a logic high output signal of 5 volts if the amplitude of the signal received at the data input 18 is greater than the amplitude of the signal received at the reference input 20 and may generate a logic low output signal of 0 volts if the amplitude of the signal received at the reference input 20 is greater than the amplitude of the signal received at the data input 18. Other variations in the operation of the comparator 16 should be apparent to those skilled in the art.

In the embodiment shown, the receiver 10 also includes a processor 30. The processor 30 may be a microprocessor, macroprocessor, or other processing chip or unit. The processor 30 may also be implemented using an application specific integrated circuit ("ASIC") or other hardware circuit. The processor 30 has a processor input 32 and a processor output or port 34. In some embodiments, the processor 30 may be an 8-bit programmable microprocessor manufactured by Microchip. In some embodiments, the processor 30 is configured to generate an adaptive-controlled signal. The processor 30 may be configured to adaptively control the amplitude, duration, frequency, or any combination thereof, of the generated signal. In some embodiments, the processor 30 generates a pulse-controlled signal and outputs or injects the signal on the processor output 34. In some embodiments, the pulse-controlled signal contains a number of pulses where each pulse has similar amplitude but a varying width. The processor 30 may be configured to vary the pulse widths or pulse durations. The processor 30 may also be configured to switch between a set of predetermined set of pulse widths. In some embodiments, the input 32 of the processor 30 is coupled with the output 22 of the comparator 16, and the processor 30 may be configured to vary the pulse widths based on the signal received from the comparator 16.

In the embodiment shown, the pulse-controlled signal generated by the processor 30 is directed to a regulating resistor 36 configured to limit the current of the pulse-controlled signal. Specifically, the regulating resistor 36 may be used to protect the comparator 16 from receiving a current at an amplitude or level above the comparator's rating. One benefit of the regulating resistor 36 or similar conditioning circuitry is that it allows a generic or off-the-shelf processor to be used, since the conditioning circuitry modifies the signal to be compatible with the comparator 16. Otherwise, a specialized or specific processor capable of inherently generating a compatible signal would be required The regulating resistor 36 is coupled to a reference node 40. The reference input 20 of the comparator 16 is also coupled to the reference node 40. The reference input 20 of the comparator 16 may be configured to receive a reference signal from the reference node 40. As previously described, in one embodiment, the comparator 16 compares the amplitudes of the signals at the data input 18 and the reference input 20 and outputs the signal with the greater amplitude.

In the embodiment shown, a capacitor 42 is coupled to the reference node 40 and a reference resistor 50 connects the input node 14 and the reference node 40.

The output signal of the processor 30, as limited by the regulating resistor 36, injects charge into the reference input 20 to set the signal level where a signal of interest is detected. For example, in a keyless entry system, the charge sets the level where RF data will be detected. The activity of the capacitor 42 is also affected by this signal. Specifically, the current provided to the capacitor 42 sets the voltage at the reference node 40, and therefor the voltage level at the reference input 20. The voltage on the capacitor 42 is proportional to the magnitude of the injected current and the time duration that the current is injected as shown by the following equation.

$V=(I*t)/C$, where V is the voltage measured across the
reference node 40 and ground (in FIG. 1), I is the
current flowing through the regulating resistor
36, and C is the capacitance of the capacitor 42.

In the embodiment shown in FIG. 1, the voltage level on the capacitor 42 settles to the average voltage of the signal input to data input 18. The settling time is set by the RC time constant of the capacitance of the capacitor 42 and the resistance value of the reference resistor 50. During some portion of the reference voltage settling time, the voltage level at the reference node 40 may exceed the voltage level at the input node 14. As a consequence, only a positive excursion of the input signal delivered to the input node 14 causes the comparator 16 to output a "high" signal, i.e., to output the signal input to the data input 18. The processor 30 may also be configured to reject the artificial high pulse as noise when output by the comparator 16.

The magnitude of the reference voltage offset (i.e., the voltage level at reference node 40) is set by the value of the regulating resistor 36, the capacitance value of the capacitor 42, the differential voltage measured from the output 34 of the processor 30 to node 40 (i.e., the voltage of the capacitor 42), and the duration of the time that the processor 30 outputs a logic high signal (i.e., the width of a pulse). In the embodiment shown, it is the width of the pulse of the signal output by the processor 30 that is varied to control the level of the reference voltage. Other elements or components could be varied. For example, variable capacitors or resistors could be implemented. However, generating a pulse-width controlled signal may be accomplished relatively cheaply and easily using a relatively simple microprocessor. Adjusting other components is likely to be more expensive and complicated.

During a high amplitude pulse of the pulse-controlled signal injected by the processor 30, the capacitor 42 receives a majority of the current contained in the signal injected by the processor 30 in combination with an integrated version of the data signal received by the data input 18 of the comparator 16. In some embodiments, the reference input 20 of the comparator 16 has high resistance in comparison to the capacitor 42, and while the capacitor 42 is charging, little current is received by the reference input 20 of the comparator 16. Since little current, or a low amplitude signal, is received by the reference input 20, the amplitude of the signal received by the data input 18 of the comparator 16 is likely to exceed the amplitude of the reference signal. If so, the comparator 16 outputs the signal present at the data input 18 or a version thereof. For example, the comparator 16 may output an amplified and clipped version of the signal received from the data input 18.

During a low amplitude pulse of the pulse-controlled signal, the capacitor 42 may discharge. As the stored charge on the capacitor 42 decays, the current received at the reference node 40 increases, as does the amplitude of the reference signal received by the reference input 20 of the comparator 16. During the capacitor 42 decay, the amplitude of the reference signal received by the reference input 20 may increase to a point where the amplitude of the reference signal matches or exceeds the average amplitude of the data signal. At this point, the comparator 16 no longer automatically outputs the data signal since the amplitude of the data signal may no longer always be greater than the amplitude of the reference signal. The reference signal may decay to a point where the amplitude of the reference signal is similar to the average amplitude of the data signal, and only portions of the data signal having amplitudes greater than the average amplitude will have amplitudes greater than the amplitude of the reference signal and will be output by the comparator 16.

The processor 30 may be configured to output a high voltage at output 34, and, when not injecting current, the processor 30 may be configured to set output 34 into a high impedance state where it has no impact on the reference level. Setting the output 34 into a high impedance state mimics disconnecting the input of the processor 30 from the receiver 10.

As previously indicated, the comparator output 22 is coupled to the processor input 32. If the comparator 16 outputs the data signal, or a version thereof, the processor 30 may be configured to determine whether the data signal output by the comparator 16 contains data of interest. The processor 30 may determine if the data signal output by the comparator 16 contains data of interest by determining if the information received conforms to a predetermined format. For example, each pulse in the data signal may have a particular amplitude, width, or the like. In some embodiments, if the data signal output by the comparator 16 and received by the processor 30 only contains noise, the processor 30 may increase the reference signal so that the data signal received at the data input 18 is not output by the comparator 16. By increasing the amplitude of the reference signal, a higher amplitude data signal is required to cause the comparator 16 to output the data signal.

As indicated above, in the embodiment shown, the duration of the signal output on output 34 of the processor 30 sets the quantity of charge delivered to capacitor 42. If the processor 30 detects excessive noise in the signal from the output 22 of the comparator 16, the pulse durations are increased. Increases in pulse durations increase the value of the offset or signal at the reference node 40 and increases the amplitude of the noise required to trigger the comparator output 22. The processor 30 continuously samples input information while turning the output 34 of the processor 30 from the +5 V output state (logic high) to the high impedance state.

If the comparator output 22 is quiet for too long, the charge pulse duration is reduced to lower the comparator reference voltage offset and increase the sensitivity of the receiver 10.

Figure 2:
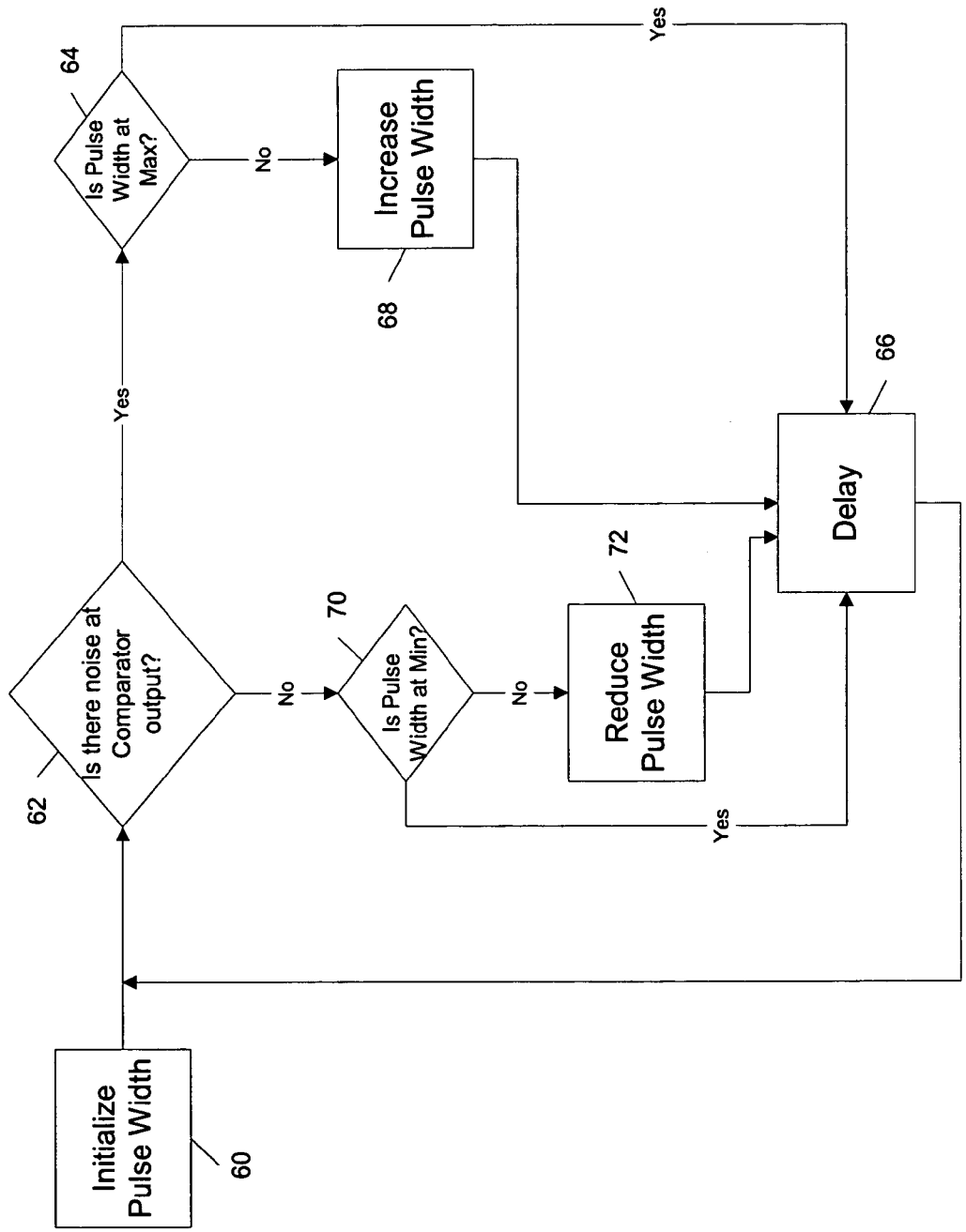
FIG. 2 is a flow chart illustrating the signal processing of the processor of FIG. 1.

FIG. 2 is a flow chart illustrating exemplary signal processing performed by the processor 30. Starting at block 60, the processor 30 initializes the pulse width. For example, the processor 30 may set the initial pulse width to 100 microseconds. The processor 30 may also initialize other aspects of the processing performed by the processor 30 such as setting the frequency of the pulse, such as generating a pulse every 12 milliseconds. After the pulse width and other aspects have been initialized, the processor 30 begins to output the pulse-controlled signal and process the signal received from the comparator 16. At block 62, the processor 30 determines whether the output received from the comparator 16 contains noise. (A way to determine whether a signal contains noise is to determine whether the signal contains information that conforms to a predetermined format. If the signal does not conform, it is assumed to have noise or at least too much noise in order to process). If the received signal does contain noise, the processor 30 determines if the pulse width can be increased or if the pulse width has already been increased to a maximum amount (block 64). The pulse width may have a maximum value such as 130 microseconds. Increasing the pulse width to a value more than the predetermined limit may cause the receiver to malfunction or operate inaccurately or incorrectly. If the pulse width has already been increased to the maximum amount allowed, the processor 30 may wait or delay a predetermined amount of time (block 66) and then may recheck the output received from the comparator 16 (block 62). The delay may be used to set a limit on the amount of current or power the processor 30 consumes. Without the delay, the receiver may continuously loop and process the signal received from the comparator 16. The processor 30 may be configured or programmed to wait 5, 10, or more seconds between checking the signal received from the comparator 16.

Alternatively, if the pulse width has not already been increased to the maximum value, the processor 30 increases the pulse width at step 68. As previously indicated, increasing the pulse width raises the offset to the comparator 16, which raises the required amplitude of the data signal needed to be output by the comparator 16. In some embodiments, the processor 30 may increase the pulse width by 10 microseconds. After the processor 30 increases the pulse width, the processor 30 delays a predetermined amount of time before determining if the adjusted offset value is sufficient to quiet the noise on the output 22 of the comparator 16 (block 66).

If the processor 30 determines that the output received from the comparator 16 does not contain noise (block 62), the processor 30 determines whether the pulse width has already been reduced to a minimum value at block 70. The processor 30 may be configured with a minimum limit that regulates the smallest pulse width that should be used. For example, the processor 30 may be configured to prohibit the pulse width from being lower than 70 microseconds. If the processor 30 determines that the pulse width is currently set at the lowest allowed value, such as 70 microseconds, the processor 30 may leave the pulse width unmodified and wait or delay a predetermined amount of time as previously described before checking for noise again (block 66).

If, on the other hand, the processor 30 determines that the current pulse width is not set at the minimum value, the processor 30 decreases the pulse width at block 72. The processor 30 may be configured to decrease the pulse with by a predetermined amount, such as 10 microseconds. After decreasing the pulse width, the processor 30 then delays a given amount of time (block 66) before rechecking the received signal for noise (block 66).

If the processor 30, however, determines that the output received from the comparator 16 does not contain noise, or otherwise, possibly contains data, the processor 30 may be configured to forward the received signal to other processing components or may perform signal processing itself. The received signal may be processed to determine whether an action, such as unlocking the doors of a vehicle, should be taken in light of the data or information present in the received signal.

Various features and aspects of embodiments of the invention are set forth in the following claims.

The invention claimed is:

1. A method of establishing an offset for a radio receiver of a vehicle system, the method comprising:
   receiving at, an input node, a current input signal from a transmitter device of the vehicle system via a reception element;
   configuring a processor to adaptively control at least one of the amplitude, duration, and frequency of a first signal;
   generating, with the processor, the first signal;
   establishing a reference signal at a reference node, the reference signal based on the current input signal and the first signal, wherein a conductive path with a reference resistor and without clocked elements joins the input node and the reference node;
   comparing an amplitude of the current input signal to an amplitude of the reference signal and generating an output signal based on the comparison, wherein the output signal includes either 1) a first output signal if the amplitude of the current input signal is greater than the amplitude of the reference signal or 2) a second output signal if the amplitude of the reference signal is greater than the amplitude of the current input signal,
   providing the output signal to the processor;
   analyzing the output signal to determine whether the output signal contains noise; and
   modifying the first signal based on the analysis of the output signal to
      increase at least one of the amplitude, duration, and frequency of the first signal if the output signal is determined to contain noise, and
      decrease at least one of the amplitude, duration, and frequency of the first signal if the output signal is determined to not contain noise.

2. The method as claimed in claim 1, further comprising coupling a capacitor to the reference node.

3. The method as claimed in claim 1, further comprising filtering the current input signal.

4. The method as claimed in claim 1, further comprising regulating the first signal with a resistor.

5. The method as claimed in claim 1, wherein modifying the first signal includes modifying a pulse width of the first signal.

6. The method as claimed in claim 1, wherein modifying the first signal includes modifying a frequency of the first signal.

7. The method as claimed in claim 1, wherein modifying the first signal includes modifying an amplitude of the first signal.

8. The method as claimed in claim 1, wherein analyzing the output signal to determine whether the output signal contains noise includes determining if the output signal conforms to a predetermined format with at least one of a particular width and a particular amplitude.

9. The method as claimed in claim 1, wherein modifying the first signal based on the analysis of the output signal includes increasing a pulse width of the first signal if the output signal contains noise.

10. The method as claimed in claim 1, wherein modifying the first signal based on the analysis of the output signal includes decreasing a pulse width of the first signal if the output signal does not contain noise.

11. The method as claimed in claim 1, wherein the first output signal is the current input signal and the second output signal is the reference signal.

12. The method as claimed in claim 1, wherein the first output signal is a logic high and the second output signal is a logic low.

13. The method as claimed in claim 1, wherein the first output signal is a logic low and the second output signal is a logic high.

14. A radio receiver of a vehicle system with an adjustable offset, the receiver comprising:
   a comparator having a first input coupled to a first node, a reference input coupled to a reference node, and an output, the comparator configured to compare an amplitude of the current input signal at the first input to an amplitude of a reference signal at the reference node, and to generate an output signal, wherein a conductive path with a reference resistor and without clocked elements loins the input node and the reference node;
   wherein the output signal includes either 1) a first output signal if the amplitude of the current input signal is greater than the amplitude of the reference signal or 2) a second output signal if the amplitude of the reference signal is greater than the amplitude of the current input signal,
   a processor having an input coupled to the output of the comparator and an output coupled to the reference node, the processor configured to generate a first signal and to adaptively control at least one of an amplitude, duration, and frequency of the first signal, to receive the output signal of the comparator on the input, to analyze the output signal of the comparator to determine whether the output signal of the comparator contains information that conforms to a predetermined format, and to modify the first signal based on the analysis of the output signal of the comparator to
   increase at least one of the amplitude, duration, and frequency of the first signal if the output signal is determined to contain noise, and
   decrease at least one of the amplitude, duration, and frequency of the first signal if the output signal is determined to not contain noise,
   wherein the reference node establishes the reference signal based on the current input signal and the first signal.

15. The receiver as claimed in claim 14, further comprising a capacitor coupled to the reference input.

16. The receiver as claimed in claim 14, further comprising a reference resistor coupled between the input node and the reference node.

17. The receiver as claimed in claim 14, further comprising a regulating resistor coupled to the second output of the processor.

18. The receiver as claimed in claim 14, wherein the processor is configured to increase a pulse width of the first signal if the output signal does not contain information that conforms to a predetermined format.

19. The receiver as claimed in claim 18, wherein the processor is configured to determine if a pulse width of the first signal is a maximum width.

20. The receiver as claimed in claim 19, wherein the processor is configured to delay a predetermined amount of time if the pulse width of the first signal is the maximum width.

21. The receiver as claimed in claim 20, wherein the processor is configured to determine if a pulse width of the first signal is a minimum width.

22. The receiver as claimed in claim 14, wherein the processor is configured to decrease a pulse width of the first signal if the output signal contains information that conforms to a predetermined format.

23. The receiver as claimed in claim 22, wherein the processor is configured to delay a predetermined amount of time if the pulse width of the first signal is the minimum width.

24. A radio receiver of a vehicle system, the receiver comprising:

means for receiving, at an input node, a current input signal;

means for generating a first signal;

means for controlling at least one of the amplitude, frequency, and duration of the first signal;

means for establishing a reference signal, at a reference node, the reference signal based on the current input signal and the first signal, wherein a conductive path with a reference resistor and without clocked elements joins the input node and the reference node;

means for comparing an amplitude of a version of the current input signal and an amplitude of a version of the reference signal;

means for generating a result signal, wherein the result signal includes either 1) a first output signal if the amplitude of the version of the current input signal is greater than the amplitude of the version of the reference signal or 2) a second output signal if the amplitude of the version of the reference signal is greater than the amplitude of the version of the current input signal, means for analyzing the result signal to determine whether the result signal contains information that conforms to a predetermined information format; and means for modifying the first signal based on analyzing the result signal to increase at least one of the amplitude, duration, and frequency of the first signal if the output signal is determined to contain noise, and decrease at least one of the amplitude, duration, and frequency of the first signal if the output signal is determined to not contain noise.

* * * * *